United States Patent Office 3,288,897
Patented Nov. 29, 1966

3,288,897
DYEABLE MATERIALS
Giorgio Leicht, Terni, Italy, assignor to Montecatini Societa Generale per l'Industria Mineraria e Chimica, Milan, Italy
No Drawing. Filed May 14, 1963, Ser. No. 280,417
Claims priority, application Italy, May 18, 1962, 10,000/62
21 Claims. (Cl. 264—78)

The present invention relates to the preparation of articles such as textile fibers, films, tapes, and other shaped articles from polyolefins consisting essentially of isotactic macromolecules obtained by low pressure polymerization with stereospecific catalysts, which articles are unusually receptive to various types of dyes.

More particularly, the present invention relates to the preparation of dyeable textile fibers and the like by the extrusion of a mixture of a polyolefin and a crystalline polyepichlorohydrin.

The polyolefins which are suitable are obtained by polymerizing a monomer of the formula:

$$R-CH=CH_2$$

in which R is an alkyl or aryl group or a hydrogen atom. Thus, suitable polyolefins include polyethylene, polybutene-1, polypentene-1, poly-4-methylpentene-1, polystyrene, polypropylene, and the like.

The preferred polyolefin is polypropylene consisting prevailingly of isotactic macromolecules.

Various processes for preparing fibers from polyolefins have been described heretofore. These fibers have remarkable characteristics, particularly as regards tenacity and resistance to chemical agents. However, they exhibit a poor receptivity to dyes.

It is an object of the present invention to provide a process for preparing fibers from polyolefins, which fibers exhibit a good receptivity to dyes, as well as the exceptional properties of mechanical and chemical resistance which are characteristics of polypropylene fibers.

We have now surprisingly found that textile fibers having an unusual affinity for dyes are obtained by extruding a mixture of a polyolefine with 1 to 25%, by weight of the mixture, of a polyepichlorohydrin, which polyepichlorohydrin is preferably crystalline.

The fibers used in this invention are treated, before or after stretching, with aliphatic, aromatic of heterocycle amines or imines. After this treatment the fibers exhibit a high receptivity for dyes, particularly acid dyes.

The polyepichlorohydrins used in the mixture of the invention are prferably obtained by stereospecific polymerization of epichlorohydrin in the presence of a suitable catalytic system, e.g., $FeCl_3$ and propylene oxide; $FeCl_3$ and halohydrin; a mixture of $ZnCl_2$ and an organometal compound, such as an aluminum alkyl, aluminum isopropoxide, etc; alkyl aluminum halides, such as diethyl aluminum chloride, or derivatives thereof; and the like.

It will be seen that the present invention also relates to dyeable polymeric compositions of:
(a) A polyolefin, preferably isotactic polypropylene,
(b) from about 1 to 25% by weight, based on the mixture, of a polyepichlorohydrin, preferably one which is crystalline, obtained by the polymerization of epichlorohydrin.

The present invention also relates to fibers and the other shaped articles obtained by treating with an amine or imine the articles prepared by extrusion of polyolefins and polyepichlorohydrin.

The mixing of the polyepichlorohydrin with the polyolefin is usually carried out by merely mixing the solid polymers while agitating.

The mixture can, of course, be carried out by other methods, e.g., mixing the polyolefin with a solution of polyepichlorohydrin in a suitable solvent, followed by evaporation of the solvent; or by the addition of polyepichlorohydrin to the polyolefin at the end of the polymerization, etc.

The polyepichlorohydrins used in this invention exhibit a good compatibility with polyolefins in the molten state and have no staining action.

The mixture is granulated and then extruded in a melt spinning device, preferably using spinnerets having a length/diameter ratio greater than 1.

The graulation and spinning are carried out by operating in the absence of oxygen, and preferably under an inert gas (e.g., nitrogen).

During the mixing, stabilizers, opacifiers, and organic or inorganic pigments can be added to the polyolefin.

The fibers, after spinning, are subjected to a stretching process, with stretching ratios of from about 1:2 to 1:10, at a temperature of from about 80 to 150° C., in a stretching device heated with hot air, steam, or similar fluids, or provided with a heating plate.

If desired, the fibers can then be subjected to a dimensional stabilization treatment under conditions of free or hindered shrinking at a temperature of from about 80 to 160° C.

The fibers obtained by extrusion of the mixes of the present invention can be mono- or plurifilaments and can be used for preparing continuous fibers, staple fibers, bulk yarns, ar bulk staple fibers.

The mono- or plurifilaments obtained according to the rinvention are subjected to treatments with a solution desirably containing from about 5 to 65% by weight of an aliphatic aromatic, or heterocyclic amine or imine. More particularly, suitable amines and imines include ethylene diamine, trimethylene diamine, diethylene triamine, tetramethylene pentamine, ethyleneimine, polyethyleneimine, piperazine and its derivatives, p-menthanediamine, n-dodecylamine, n-octadecyl amine, and the like.

The fiber bath ratio is desirably from about 1:10 to 1:50.

This treatment can be carried out either continuously or batchwise, for a time varying from a few (2–3) seconds to 24 hours, in the presence or absence of solvents, and at a temperature of from about room temperature to 10° C. below the melting point of the polymer (about 165° C.).

Where a tinctorial modifier is employed, the mono- or plurifilaments of the invention can also be subjected to further treatments for rendering completely water-unsoluble such tinctorial modifier in the final manufactured articles, e.g., by treatment with mono- or diepoxy compounds, mono- and diisocyanates, mono- or dialdehydes, halogens, divinylbenzene and the like.

This treatment, as well as the treatment with amines or imines, can be carried out before or after stretching.

Also in accordance with the present invention, the treatment with amines or imines can be carried out by first subjecting the polyepichlorohydrin to such treatment and thereafter mixing the resulting product with the polyolefin.

The fibers and the other manufactured articles of this invention can, if desired, be subjected to an acid treatment, more particularly with sulfuric acid, to further improve the dyeability and the color fastness.

The compositions of the present invention can be used for preparing not only fibers but also films, tapes, shaped articles and the like.

Fibers obtained in accordance with the present invention exhibit a remarkable receptivity for acid dyes, metallized dyes and disperse dyes. They also show a good affinity for basic dyes and vat dyes.

The fibers obtained by extrusion of the compositions of the present invention show a high stability particularly against light.

The control dyeing tests were carried out for 1½ hours at the boiling point, in baths containing 2.5% of dye by weight of the fiber, with a fiber/bath ratio of 1:40.

Dyeing with acid and metallized dyes was carried out in the presence of 3% ammonium acetate (calculated on the fiber weight) and of 1% of a surface-active agent, namely, the condensation product of 6–20 mols of ethylene oxide with one mol of an alkylphenol such as p-tert. octylphenol, nonyl phenol and the like.

After 30 minutes from the commencement of boiling, 2% (calculated on the fiber weight) of a 20% acetic acid solution was added in order to improve the exhaustion of the bath.

After dyeing, the fibers were rinsed with running water; they showed intense colors with acid dyes, metallized dyes, and disperse dyes.

The color fastness to light, washing and rubbing was very satsifactory.

Variations and modifications can of course be made without departing from the spirit and the scope of the invention.

The following examples will further illustrate the invention.

EXAMPLE 1

Polyepichlorohydrin obtained by polymerization of epichlorohydrin in the presence of aluminum diethylmonochloride, $Al(C_2H_5)_2Cl$, and having an intrinsic viscosity $[\eta]$ of 0.22 (determined in acetone solution at 30° C.) is mixed at room temperature with polyproylene, acetone, and dibasic lead stearate in a Henschel type mixer to prepare the following mixture:

Material:                                                          Amount
 (a) Polypropylene (intrinsic viscosity $[\eta]$ 1.58, ash content 0.015%, residue after heptane extraction 95.6%) _____kg__ 94.7
 (b) Polyepichlorohydrin _____kg__ 5
 (c) Dibasic lead stearate _____g__ 300
 (d) Acetone _____kg__ 10

The solvent is then eliminated by evaporation.

The mixture, when molten in a test tube at 250° C. for 10 minutes, has a clear color.

The mixture is granulated in an extruder under an oxygen-free nitrogen atmosphere at 210° C.

The operating conditions and the results obtained are reported in the table hereinafter.

EXAMPLE 2

Polyepichlorohydrin obtained by polymerization of epichlorohydrin in the presence of $Al(C_2H_5)_2Cl$ and having an intrinsic viscosity $[\eta]$ of 0.3 (determined in acetone solution at 30° C.) is mixed with polypropylene, acetone, and a cresol at room temperature in a Henschel type mixer to prepare the following mixture:

Material:                                                          Amount
 (a) Polypropylene (intrinsic viscosity $[\eta]=1.58$; ash content 0.015%; residue after heptane extraction 95.6%) _____kg__ 94.7
 (b) Polyepichlorohydrin _____kg__ 5
 (c) 2,6-di-tertiary butyl-p-cresol _____g__ 300
 (d) Acetone _____kg__ 10

The solvent is then eliminated by evaporation.

The mixture, molten in a test tube at 250° C. for 10 minutes, has a clear color.

The mixture is then granulated in an extruder, under an oxygen-free nitrogen atmosphere, at 210° C.

The operating conditions and the results obtained are reported in the table hereinafter.

EXAMPLE 3

Polyepichlorohydrin obtained by polymerization of epichlorohydrin in the presence of $Al(C_2H_5)_2Cl$ and having an intrinsic viscosity $[\eta]$ of 0.22 (determined in acetone solution at 30° C.) is mixed with polypropylene, a stearate, a cresol, and acetone at room temperature in a Henschel type mixer to prepare the following mixture:

Material:                                                          Amount
 (a) Polypropylene (intrinsic viscosity $[\eta]=1.58$; ash content 0.015%; residue after heptane extraction 95.6%) _____kg__ 90
 (b) Polyepichlorohydrin _____kg__ 9.1
 (c) Dibasic lead stearate _____g__ 300
 (d) Calcium stearate _____g__ 300
 (e) 2,6-di-tertiary butyl-p-cresol _____g__ 300
 (f) Acetone _____kg__ 10

The solvent is then eliminated by evaporation.

The mix, molten in a test tube at 250° C. for 10 minutes, has a clear color.

The mix is then granulated in an extruder, under an oxygen-free nitrogen atmosphere, at 210° C.

The operating conditions and the results obtained are reported in the following table.

*Table*

|  | Example 1 | Example 2 | Example 3 |
|---|---|---|---|
| Spinning conditions: |  |  |  |
| Screw temperature, ° C | 240 | 240 | 240 |
| Head temperature, ° C | 240 | 240 | 240 |
| Spinneret temperature, ° C | 230 | 230 | 230 |
| Spinneret type, mm | 40/0.8 x 16 | 40/0.8 x 16 | 40/0.8 x 16 |
| Max. pressure (kg./cm.²) | 75 | 70 | 78 |
| Winding speed (m./minute) | 300 | 300 | 300 |
| Stretching conditions: |  |  |  |
| Temperature, ° C | 140 | 140 | 140 |
| Medium | Steam | Steam | Steam |
| Stretching ratio | 1:5.4 | 1:5.4 | 1:5.4 |
| Finishing: |  |  |  |
| Treatment for 4 hours with a 20% heptane solution of piperazine at a temperature (° C.) of | 98 | -------- | 98 |
| Treatment for 1 hour with a 20% aqueous ethyleneimine solution at a temperature (° C.) of | -------- | 100 | -------- |
| Characteristics of the stretched fiber: |  |  |  |
| Tenacity (g./den.) | 5.1 | 5.0 | 4.9 |
| Elongation (percent) | 24 | 27 | 28.5 |
| Dyeing with acid dyes: |  |  |  |
| Alizarine yellow 2G (C.I. Mordant yellow 1) | Good | Good | Good |
| Wool red B (C.I. acid red 115) | Good | Good | Good |
| Alizarine red S (C.I. Mordant red 3) | Good | Good | Good |
| Alizarine blue SE (C.I. acid blue 43) | Good | Good | Good |
| Acid black IVS (C.I. acid black 1) | Good | Good | Good |
| Dyeing with metallized dyes: |  |  |  |
| Lanasyn yellow GLN (C.I. acid yellow 112) | Good | Good | Good |
| Lanasyn red 2 GL (C.I. acid red 216) | Good | Good | Good |
| Lanasyn brown 3RL (C.I. acid brown 30) | Good | Good | Good |
| Dyeing with disperse dyes: |  |  |  |
| Setacyl yellow 3G (C.I. disperse yellow 20) | Good | Good | Good |
| Cibacet scarlet BR (C.I. disperse red 18) | Good | Good | Good |
| Brilliant setacyl blue BG C.I. disperse blue 3) | Good | Good | Good |
| Color fastness with acid dyes | Good | Good | Good |
| Color fastness with metallized dyes | Good | Good | Good |
| Color fastness with disperse dyes | Good | Good | Good |

Having thus described the invention, what we claim by Letters Patent is:

1. A process for preparing, by molten mass extrusion followed by stretching, dyeable textile fibers, films, tapes, and other shaped articles from polyolefins consisting essentially of isotactic macromolecules, this process comprising mixing with a polyolefin from about 1 to 25%, by weight of said mixture, of a crystalline polyepichlorohydrin, and extruding said mixture.

2. The process of claim 1 wherein said extrudate is treated with a nitrogen compound selected from the group consisting of aliphatic amines, aliphatic imines, aromatic amines, aromatic imines, heterocyclic amines, and heterocyclic imines.

3. The process of claim 1 wherein said polyolefin is polypropylene consisting prevailingly of isotactic macromolecules.

4. The process of claim 1 wherein said mixing of said polyolefin with said polyepichlorohydrin is accomplished by intimately contacting said polyolefin with a solution of said polyepichlorohydrin and subsequently eliminating the solvent by evaporation.

5. The process of claim 1 wherein said polyepichlorohydrin is admixed with said polyolefin at the end of polymerization of said polyolefin.

6. The process of claim 2 wherein there are added to said mixture a stabilizer, opacifier, and pigment.

7. The process of claim 2 wherein said extrusion is effected through spinnerets having holes with a diameter of at least 0.5 mm. and a length/diameter ratio greater than 1.

8. The process of claim 7 wherein said extrusion is carried out in the absence of oxygen.

9. The process of claim 2 wherein said fibers and films, after extrusion, are subjected to a stretching treatment with a stretching ratio of from about 1:2 to 1:10, at a temperature of from about 80 to 150° C.

10. The process of claim 9 wherein said stretched fibers and films are subjected to a thermal dimensional stabilization treatment at a temperature of from about 80 to 160° C.

11. The process of claim 2 wherein said nitrogen compound is selected from the group consisting of ethylenediamine, trimethylenediamine, diethylene triamine, tetraethylene pentamine, ethyleneimine, polyethylene imine, piperazine and its derivatives, p-methanediamine, n-dodecylamine, and n-octadecylamine.

12. The process of claim 2 wherein said extrudate treatment is carried out for from 2–3 seconds to 24 hours at a temperature of from about room temperature to 10° C. below the melting point of the polymer.

13. The process of claim 12 carried out continuously.

14. The process of claim 12 carried out batchwise.

15. The process of claim 1 wherein prior to said mixing of said polyolefin with said polyepichlorohydrin, said polyepichlorohydrin is treated with a nitrogen compound selected from the group consisting of aliphatic amines, aliphatic imines, aromatic amines, aromatic imines, heterocyclic amines, and heterocyclic imines.

16. The process of claim 2 wherein said extrudate is, after said treatment with said nitrogen compound, treated with a reactant capable of water-insolubilizing the polyepichlorohydrin present in said extrudate, said reactant being selected from the group consisting of mono- and diepoxy compounds, mono- and diisocyanates, mono- and dialdehydes, halogens, and divinylbenzene.

17. The process of claim 2 wherein said extrudate is subjected to an acid treatment to thereby improve further the dyability and the color fastness thereof.

18. A dyeable polymeric composition comprising
 (a) a polyolefin consisting prevailingly of isotactic macromolecules and
 (b) from about 1 to 25%, by weight of said composition of a polyepichlorohydrin.

19. A dyeable polymeric composition comprising
 (a) polypropylene consisting prevailingly of isotactic macromolecules, and
 (b) from about 1 to 25%, by weight of said composition of a polyepichlorohydrin.

20. Textile fibers made of the composition of claim 18.

21. A process for preparing, by molten mass extrusion followed by stretching, dyeable textile fibers, films, tapes, and other shaped articles from crystalline polyolefins, this process comprising mixing with a crystalline polyolefin from about 1 to 25%, by weight of said mixture, of a preferably crystalline polyepichlorohydrin, and extruding said mixture.

References Cited by the Examiner

UNITED STATES PATENTS

| | | | |
|---|---|---|---|
| 2,131,145 | 9/1938 | Schlack | 8—94.33 |
| 3,013,998 | 12/1961 | Battaglioli | 264—78 |
| 3,126,246 | 3/1964 | Cappuccio et al. | 264—78 |

ALEXANDER H. BRODMERKEL, *Primary Examiner.*

B. SNYDER, *Assistant Examiner.*